United States Patent [19]
Jain et al.

[11] Patent Number: 5,655,154
[45] Date of Patent: Aug. 5, 1997

[54] METHOD AND SYSTEM FOR SHARING UTILITIES BETWEEN OPERATING SYSTEMS

[75] Inventors: Naveen Jain; John Hensley, both of Redmond, Wash.

[73] Assignee: Microsoft Corporation, Redmond, Wash.

[21] Appl. No.: 418,865

[22] Filed: Apr. 7, 1995

Related U.S. Application Data

[63] Continuation of Ser. No. 88,194, Jul. 6, 1993, abandoned.
[51] Int. Cl.$^6$ .................................................. G06F 13/00
[52] U.S. Cl. ............................................. 395/899; 395/651
[58] Field of Search ................................ 395/375, 600, 395/700, 800, 200–208, 899, 651

[56] References Cited

U.S. PATENT DOCUMENTS

| | | | |
|---|---|---|---|
| 4,626,986 | 12/1986 | Mori | 395/700 |
| 4,779,187 | 10/1988 | Letwin | 395/700 |
| 4,825,358 | 4/1989 | Letwin | 395/200.1 |
| 4,835,677 | 5/1989 | Sato et al. | 395/700 |
| 5,027,271 | 6/1991 | Curley et al. | 395/200 |

(List continued on next page.)

OTHER PUBLICATIONS

Accessing the Windows API From the DOS Box, Part I. by Schulaman, DC Magazine Aug. 92 VII N14 p. 479(8).
Interworking Between MS Windows, PM and X–Windows. *Tools and Utilities Guide*, Borland Corporation, WIN/DOS 3.1 Product Documentation, 1991, 1992, pp. 3–8.

(List continued on next page.)

*Primary Examiner*—Richard L. Ellis
*Assistant Examiner*—Zarni Maling
*Attorney, Agent, or Firm*—Seed and Berry LLP

[57] ABSTRACT

A method and system for incorporation into an active operating system of a utility function performed by a utility provided by an external operating system. The functional instructions within the utility which perform the utility function, called a utility engine, are separated from user interface instructions which interface with the user in a fashion unique to the external operating system. The utility engine is stored in a data structure that can be loaded for execution by the active operating system as well as the external operating system. When the active operating system is running and obtains a request to perform the utility, it performs user interface instructions specific to the active operating system, and loads and executes the functional instructions in the utility engine to thereby execute the utility function.

21 Claims, 5 Drawing Sheets

U.S. PATENT DOCUMENTS

| | | | |
|---|---|---|---|
| 5,109,515 | 4/1992 | Laggis et al. | 395/725 |
| 5,134,580 | 7/1992 | Berham et al. | 395/650 |
| 5,136,712 | 8/1992 | Perazzoli et al. | 395/700 |
| 5,155,809 | 10/1992 | Baker et al. | 395/200 |
| 5,230,065 | 7/1993 | Curley et al. | 395/200 |
| 5,261,101 | 11/1993 | Fenwick | 395/700 |
| 5,265,240 | 11/1993 | Galbraith et al. | 395/550 |
| 5,359,725 | 10/1994 | Garcia et al. | 395/500 |
| 5,375,241 | 12/1994 | Walsh | 395/700 |
| 5,392,409 | 2/1995 | Umeno et al. | 395/400 |
| 5,410,709 | 4/1995 | Yu | 395/725 |
| 5,414,851 | 5/1995 | Brice, Jr. et al. | 395/650 |
| 5,452,455 | 9/1995 | Brown et al. | 395/700 |
| 5,459,867 | 10/1995 | Adams et al. | 395/700 |
| 5,463,754 | 10/1995 | Beausoleli et al. | 395/200.08 |
| 5,471,615 | 11/1995 | Amatsu et al. | 395/200.03 |

OTHER PUBLICATIONS

*Turbo Profiler User's Guide,* Borland Corporation, WIN/DOS 3.1 Product Documentation, 1988, 1991, pp. 186–187.

*Turbo Debugger User's Guide,* Borland Corporation, WIN/DOS 3.1 Product Documentation, 1988, 1991, pp. 276–281, 297–303.

*Turbo Assembler User's Guide,* Borland Corporation, WIN/DOS 3.1 Product Documentation, 1988, 1991, pp. 312–313.

*Borland C++ Programmer's Guide,* Borland Corporation, WIN/DOS 3.1 Product Documentation, 1991, 1992, pp. 332–338.

*Borland C++ User's Guide,* Borland Corporation, DOS 2.0 Product Documentation, 1991, pp. 103–129.

Shaw, R., "C++, Windows, and Paradox, " *DBMS,* Aug. 1991, pp. 60–62, 64–65.

Schulz, P., "Borland C++ Version 2.0, " *Infoworld,* Apr. 8, 1991, pp. 55–65.

O'Brien, D., "Turbo in a Suit, " *EXE,* Mar., 1991, pp. 33–39.

Coffee, P., "Borland, International, Inc.: Borland C++ 2.0, " *PC Week,* Jun. 10, 1991.

"Windows: Borland Ships New C++ Programming Tools; Allows Professional Developers to Create Windows Applications, " *EDGE: Workgroup Computing Report,* Feb. 18, 1991.

METHOD AND SYSTEM FOR SHARING UTILITIES BETWEEN OPERATING SYSTEMS

CROSS-REFERENCE TO RELATED APPLICATION

This application is a file wrapper continuation of U.S. patent application Ser. No. 08/088,194, filed Jul. 6, 1993, now abandoned.

TECHNICAL FIELD

The present invention relates to the field of operating systems and, more specifically, to operating system utilities.

BACKGROUND OF THE INVENTION

The modern computer system provides users with the ability to run a large variety of application programs. Such a computer system contains, as shown in FIG. 1, a computer 100 which has a central processing unit (CPU) 102, a memory 104 and an input/output (I/O) unit 106. The computer system also includes various peripheral devices, such as a keyboard 110, a mouse 115, a monitor 120 and a disk 130, all of which are connected to the computer 100 via the I/O unit 106. The computer system also contains an operating system which manages and executes the application programs. The operating system is stored in the memory 104 and executed by the CPU 102. The operating system controls the allocation and use of the central processing unit 102, the memory 104 and the peripheral devices.

An example of such an operating system is the MS-DOS® operating system, created by Microsoft Corporation. The MS-DOS operating system is widely used for controlling the operation of various personal computers. In addition to performing management of the computer system, the MS-DOS operating system also provides a number of "utilities". A utility is a computer program which performs, upon request by the user, a specific function, called herein a utility function, relating to the operating system's management and control of the computer system. For example, when a user of the MS-DOS operating system enters the command "DIR" at the MS-DOS user prompt, the operating system outputs to the display 120 a list of all files stored in a relevant directory on the disk 130 and the amount of memory used by each file.

A more recent example of an operating system is the Windows™ operating system by Microsoft Corporation. Technically speaking, the Windows system is implemented as an application running on top of the MS-DOS operating system. Once executing, however, the Windows system performs essentially as an operating system providing management and control of the computer system and completely controlling interaction between the computer system and the user. The Windows operating system provides its own set of utilities which are designed specifically for the Windows environment and which interface with the user in a fashion unique to the Windows operating system. For example, a user of the Windows operating system would obtain directory information similar to that provided by the MS-DOS "DIR" utility in a different fashion than the MS-DOS operating system. The user would, for example, use the well-known Windows "Graphical User Interface" to position the cursor on a displayed icon representing a set of file management functions and click the mouse 115 shown in FIG. 1 to display a viewport, which includes a directory listing that can be further manipulated by the user.

In many instances, the Windows and MS-DOS operating systems provide utilities which perform essentially the same utility functions. It is often desirable for an executing, or "active," operating system (such as the Windows operating system, while running on top of the MS-DOS operating system) to be able to perform a utility function performed by a utility typically provided by an "external" operating system (such as the MS-DOS operating system, while the Windows operating system is running). As explained, however, each operating system controls user interaction with the computer system in an entirely different way. Thus, in the past neither operating system has been able to take advantage of the utilities provided by the other operating system without having to surrender the user interface environment or applications executing on the active operating system.

Typically, then, when designers of the Windows operating system have wanted to include a utility function provided by the MS-DOS operating system, the only option has been to create an entirely new program executable by the Windows operating system. This option, although advantageous in providing familiar utilities to users of either operating system, is of only limited value. One problem is that roughly twice the storage space is required to store utilities that perform essentially the same utility function. Another problem is inconsistency. The designers of a utility for use by both operating systems must essentially write and test two separate programs, and a great deal of effort is thus required to ensure that each program performs the utility function in the same way. Further, a utility provided by one operating system may be corrected, updated or enhanced. In such a case, users of the other operating system will not obtain the benefit of this modification because it will execute a different program to perform the same utility function.

SUMMARY OF THE INVENTION

It is an object of the invention to incorporate into an operating system the utility function of a utility not executable by that operating system.

It is also an object of the invention to incorporate into an application running on one operating system the utility function of a utility not executable by that operating system or application running thereon.

Still further objects of the invention will be apparent as the invention is further described.

The present invention obtains these objects with a method and system for incorporating, into an active operating system, a utility function performed by a utility executable on an external operating system. All functional instructions comprised by the utility are separated and isolated from all external user interface instructions comprised by the utility. The functional instructions are those which perform the utility function when executed by the external operating system. The external user interface instructions are those which interface between the user and the external operating system when executed by the external operating system. The isolated functional instructions are executable by either the external operating system or the active operating system to perform the same utility function. These isolated functional instructions compose a utility engine which is contained in a data structure that can be loaded for execution by the active operating system as well as the external operating system.

When the active operating system is running and obtains a request to perform the utility, it performs active user interface instructions specific to the active operating system, and loads and executes the utility engine to thereby incorporate the utility function and perform the requested utility. In a preferred embodiment of the invention, the external operating system which provides the utility is the MS-DOS operating system and the active operating system is the Windows operating system. A dynamic link library containing the utility engine is stored in an executable file. When the utility is performed by the Windows operating system, the dynamic link library is loaded and a routine in the dynamic link library is executed to perform the utility function. When the utility is performed by the MS-DOS operating system, a set of load instructions in the executable file are executed to load and execute the same routine, and thereby perform the same utility function.

DETAILED DESCRIPTION OF THE INVENTION

Figure 1:
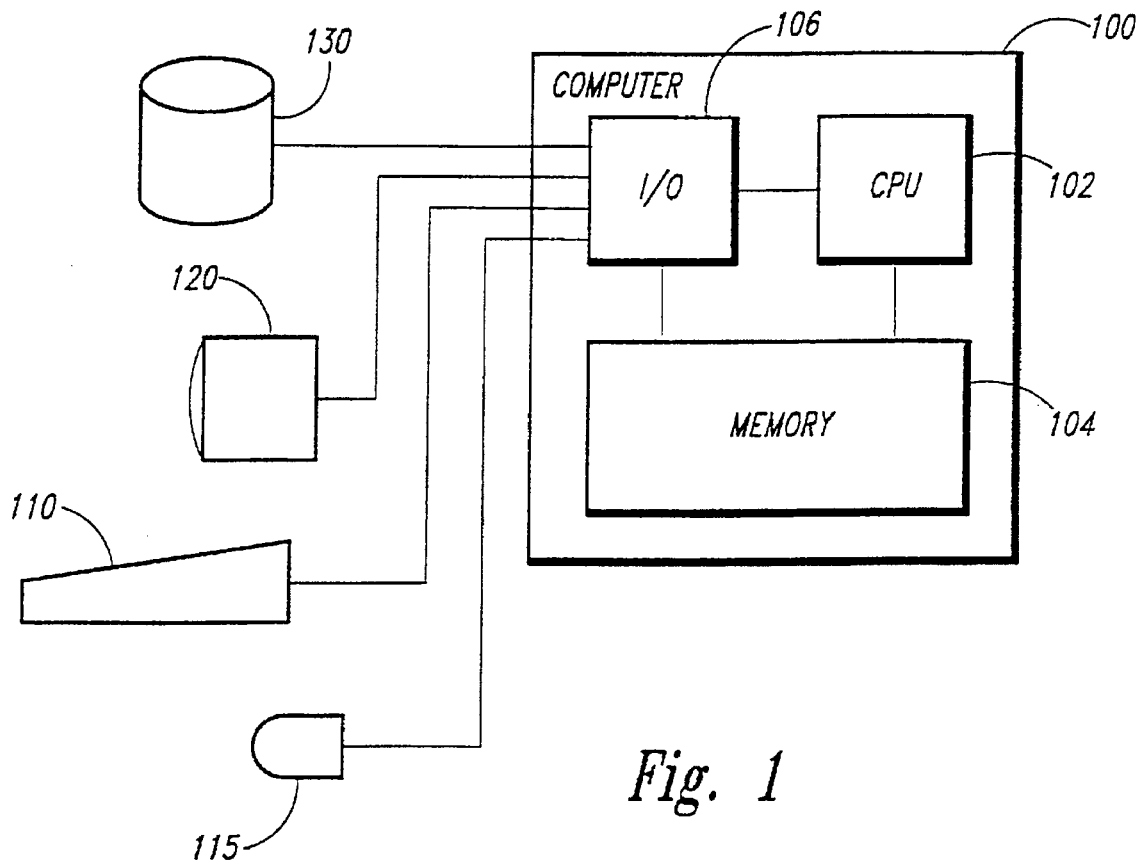
FIG. 1 is a block diagram of a conventional computer system.
Figure 2:
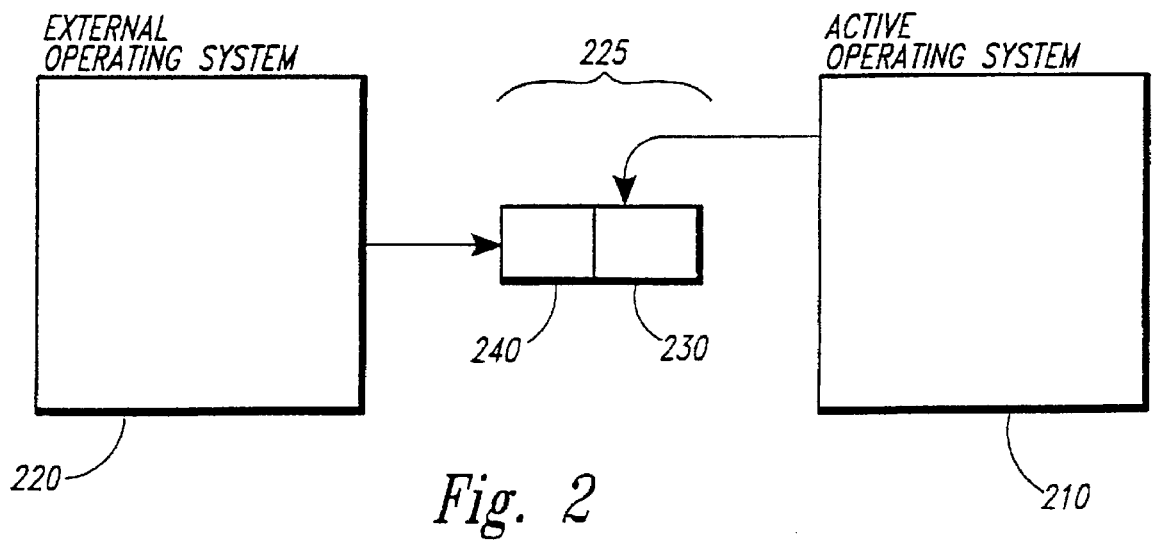
FIG. 2 is a block diagram illustrating the basic architecture of the system of the present invention.

A block diagram is shown in FIG. 2 which illustrates the basic architecture of the inventive system for operation using the conventional computer system of FIG. 1 described above. A Windows operating system 210 (which, when executing, can be referred to as an "active" operating system) and an MS-DOS operating system 220 (which, when the Windows operating system 210 is executing, can be referred to as an "external" operating system) are stored in, for example, the memory 104 of the computer 100. Alternatively, the Windows operating system 210 and the MS-DOS operating system 220 may reside on separate machines.

In accordance with the present invention, the functional instructions for performing the utility function provided by the MS-DOS utility are isolated from the user interface instructions for interfacing between the MS-DOS operating system 220 and the user. A utility is typically comprised of a set of machine language instructions executable by, for example, the CPU 102 of the computer 100. Some of these instructions relate to performing the specific utility function requested, while others relate specifically to interfacing with the user.

For example, the "DIR" utility provided by the MS-DOS operating system is implemented with machine language instructions which include functional instructions to read data from a relevant disk, determine the size of files, etc. The "DIR" utility also includes user interface instructions to obtain the parameters requested by the user, such as the desired disk drive, directory, etc., and display the resulting information in columns indicating the name and type of each file, the size of the file, etc. Other MS-DOS utilities and Windows utilities are similarly constructed. As in the MS-DOS operating system, each utility in the Windows operating system includes a set of executable instructions, some of which are functional instructions that relate specifically to performing the utility function the utility provides, and some of which are user interface instructions that relate to interfacing with the user.

As explained, the conventional MS-DOS utility has contained executable instructions which are functional instructions for performing the appropriate utility function, and has also contained user interface instructions for interfacing with the user. The invention separates these two different types of instructions so that only the functional instructions which provide the utility function will be executed by the Windows operating system. Specifically, as shown in FIG. 2, an MS-DOS utility 225 is provided which comprises a utility engine 230 stored separately from an MS-DOS utility interface 240. The utility engine 230 comprises the MS-DOS functional instructions. These functional instructions are user-interface independent. Thus, the functional instructions are not specific to the MS-DOS operating system 220, but are executable by both the MS-DOS operating system 220 and the Windows operating system 210.

Any number of MS-DOS utilities 225 may be provided as explained above, each having a utility engine 230 storing the functional instructions therein. Alternatively, the functional instructions for any number of MS-DOS utilities are contained in a single utility engine (not shown), thus taking advantage of functional instructions that are shared by multiple utilities. For example, two utilities which perform the same function might each execute a number of the same functional instructions which are stored in a single utility engine. For simplicity of explanation, however, the invention will be described herein with reference to a single utility.

The MS-DOS utility interface 240 comprises the separate MS-DOS user interface instructions that are executable only by the MS-DOS operating system 220. The MS-DOS operating system 220 performs a utility by executing the user interface instructions in the MS-DOS utility interface 240 and the functional instructions in the utility engine 230. When the Windows operating system is executing (active) and the MS-DOS operating system 220 is not executing (external), however, the Windows operating system performs its own user interface instructions and executes only the utility engine 230 within the external MS-DOS utility 225.

Figure 3:
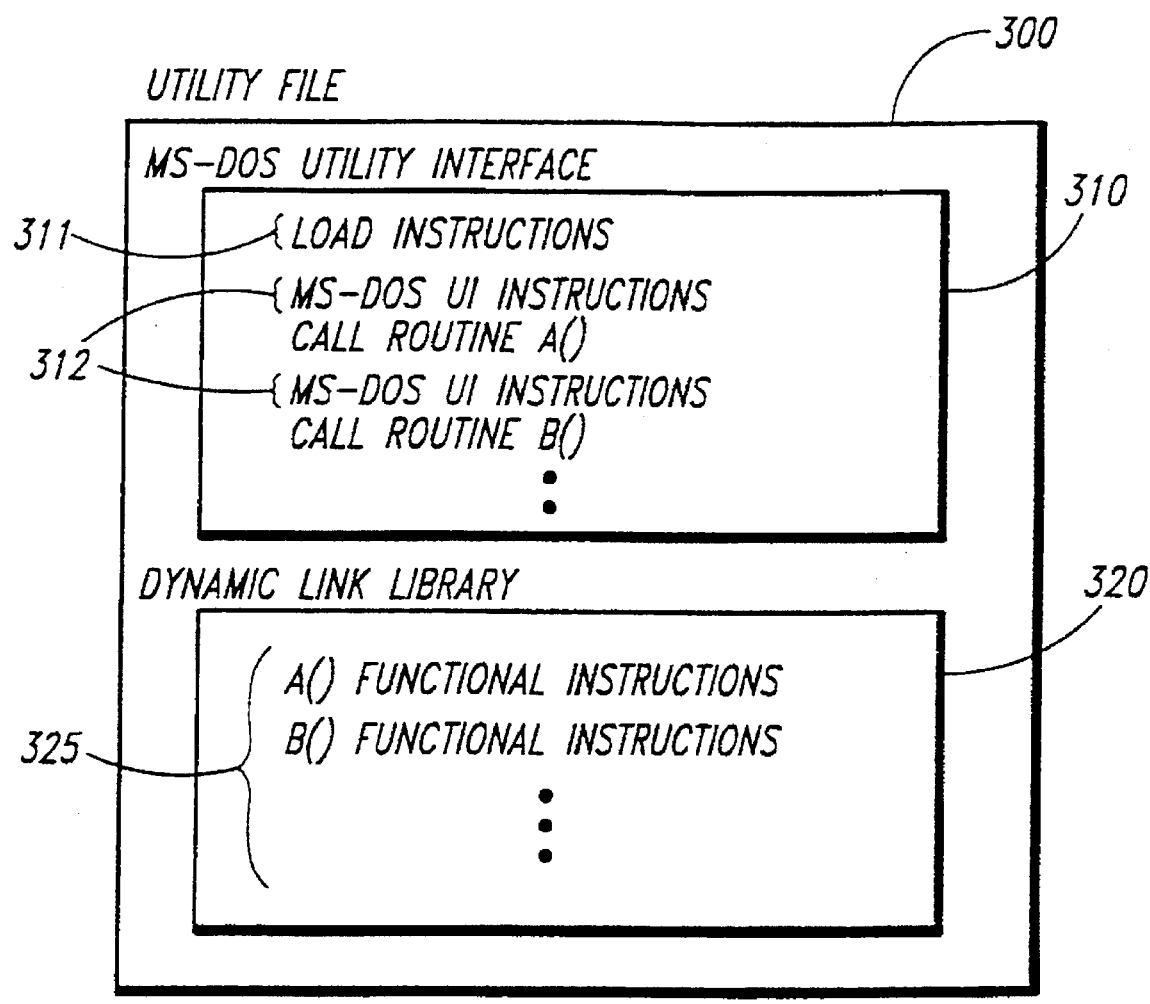
FIG. 3 is an illustration of an executable file in which a utility engine is stored in accordance with the present invention.

A file suitable for maintaining the MS-DOS utility 225 is shown in FIG. 3. In FIG. 3, a utility file 300 is shown which is an executable file such as an EXE file having the well-known "New Executable File Format" provided by the Windows operating system. Both the Windows operating system 210 and the MS-DOS operating system 220 can load and execute a portion of an EXE file which has a New Executable File Format. The utility file 300 contains an MS-DOS utility interface 310 which is, for example, one of the MS-DOS utility interfaces 240 shown in FIG. 2. The utility file 300 also contains a dynamic link library 320 which contains a utility engine 325 which is, for example, one of the utility engines 230 shown in FIG. 2.

The Windows operating system 210 performs a utility by executing its own user interface instructions and loading the dynamic link library 320 into memory and calling an appropriate routine therein, which holds the functional instructions that perform the utility function. A "dynamic link library" is a well-known data structure used by the Windows operating system. As will be illustrated in greater detail below, the Windows operating system 210 provides the capability of calling and executing a routine contained in a dynamic link library rather than within the running program. The Windows operating system provides predefined functions for loading a dynamic link library into memory and executing a called routine stored in the dynamic link library. In the case of the present invention, when the Windows operating system 210 or an application running thereon executes a utility, the Windows operating system 210 loads the dynamic link library 320 and executes the functional instructions in appropriate routines within the utility engine 325 to execute the utility (e.g., A(), B(), etc., as shown in FIG. 3), as will be explained in greater detail below.

The MS-DOS operating system 220 performs a utility in the present invention by loading and executing a portion of an appropriate utility file 300, as conventionally has been done for MS-DOS utilities that are extrinsic commands maintained on disk. The MS-DOS utility interface 310 is executed by the MS-DOS operating system 220 when executing a utility. The MS-DOS utility interface 310 includes load instructions 311 which are executable by the MS-DOS operating system to load the utility engine 325 into memory. The MS-DOS utility interface also includes MS-DOS user interface (UI) instructions 312 which are executable by the MS-DOS operating system 220 to interface with the user. Alternatively, the MS-DOS user interface instructions 312 can be stored in a different location and called by the MS-DOS utility interface when executed.

The MS-DOS operating system 220 performs the utility by loading the MS-DOS utility interface 310 into memory and executing the load instructions 311 to load the utility engine 325, and then executing the MS-DOS user interface instructions 312 and calling appropriate routines (e.g., A(), B(), etc. shown in FIG. 3) within the utility engine 325 to perform the utility. Thus, by executing the same functional instructions within the same utility engine 325, the same utility function is performed by both the MS-DOS operating system 220 and Windows operating systems 210.

Figure 4:
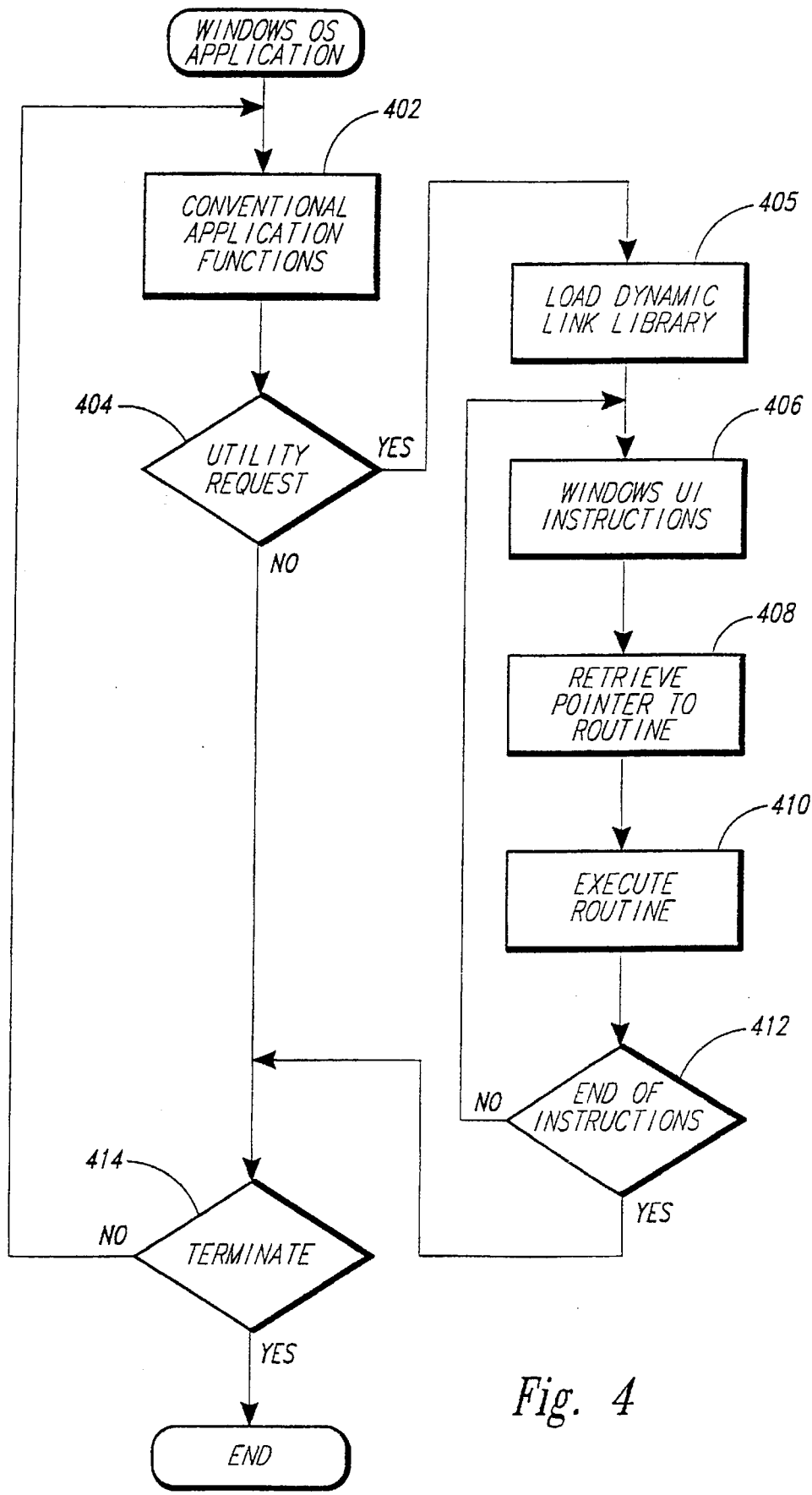
FIG. 4 is a flow diagram of the relevant portion of the Windows operating system.

As explained, when a utility is executed by the Windows operating system 210, the Windows operating system performs its own utility interface instructions and executes the routines in the appropriate utility engine 325 to perform the same utility function that the MS-DOS operating system 220 would perform. A flow diagram is shown in FIG. 4 of an application program running on the Windows operating system 210. The application program incorporates into the Windows operating system 210 a utility function of a utility provided by the MS-DOS operating system 220 so that the application program can request the utility function as needed. The program then performs the requested utility function of the MS-DOS utility. This program is executed by the CPU 102 of the computer 100 (see FIG. 1) under control of the Windows operating system 210. It will be appreciated that the method described can be similarly performed to incorporate a utility function into any operating system or application running thereon in an environment providing a similar capability of calling and executing a machine language routine during execution.

In step 402 of FIG. 4, the Windows operating system application performs conventional functions appropriate for the application. The application is, for example, the "File Manager" software program provided by Microsoft Corporation for execution on the MS-DOS operating system 220. The program performs the conventional application functions until, in step 404, the program determines that a request has been obtained to execute a utility. For example, a user of the "File Manager" application, while running on the MS-DOS operating system, would request a utility which performs a file-oriented utility function such as that performed by the "DIR" command when executed by the MS-DOS operating system. The user would request the utility by selecting an appropriate displayed menu item with the mouse 115. If an instruction to perform a utility is obtained, control branches to perform steps 405, 406, 408, 410 and 412 which perform the utility, as will be explained. Otherwise, control proceeds to step 414 wherein the Windows operating system 210 either terminates or continues to perform conventional Windows operating system functions.

In step 405, the program loads into memory the dynamic link library 320 from the utility file 300 that corresponds to the requested utility. If a request is obtained from the user to perform the utility having the same utility function as that of the "DIR" utility provided by the MS-DOS operating system, the program loads the dynamic link library stored in the file "DIR.EXE" into the memory 104 for execution by executing an appropriate function provided by the Windows environment. For example, the program executes the compiled "C" language instruction "UtilityEntry=LoadLibrary ("DIR.EXE")." This instruction calls the Windows function "LoadLibrary," which loads a dynamic link library stored in a specified file into memory for execution and returns a pointer to a main entry point in the dynamic link library. Thus, in the present "DIR" example, the dynamic link library 320 in the utility file "DIR.EXE" is loaded into memory and the variable "UtilityEntry" is assigned a pointer value pointing to the main entry point of the loaded dynamic link library 320.

In step 406, the program executes, as has been done conventionally, any user interface instructions appropriate for the requested utility. For example, the program provides a menu for selection by the user of various parameters that further define the utility requested. In step 408, the program retrieves a pointer to a routine within the utility engine 325 corresponding to the requested utility. The routine (e.g., A() shown in FIG. 3) comprises appropriate functional instructions for performing all or a portion of the utility function corresponding to the requested utility. Continuing with the same specific example, the program executes the compiled C language Windows instruction "Engine Pointer= GetProcAddress (UtilityEntry, "DirEngine")." The "GetProcAddress" function is a well-known Windows function which returns a pointer to a specified routine within a specified dynamic link library. Thus, a pointer to the routine named "DirEngine" (e.g., A() shown in FIG. 3) stored within the loaded dynamic link library 320 having a main entry point pointed to by "UtilityEntry" is retrieved, and this pointer is assigned to the variable "EnginePointer."

In step 410, the program executes the routine (e.g., A() shown in FIG. 3) within the utility engine 325. In the specific example, the utility engine 325 identified by the routine name "DirEngine" pointed to by "EnginePointer" is executed. Then, in step 412, the program determines whether additional instructions must be executed to perform the utility, such as additional Windows user interface instructions for further interfacing with the user (e.g., displaying the results of the utility function performed in a particular viewport), or additional routines within the utility engine 325 to perform the corresponding utility function (e.g., B() shown in FIG. 3). If so, the program repeats steps 405 through 412 as many times as necessary to execute the utility. Otherwise, control proceeds to step 414, and steps 402 through 412 are repeated, as appropriate, until step 414 determines that execution of the program running on the Windows operating system terminates. The program then ends.

Figure 5:
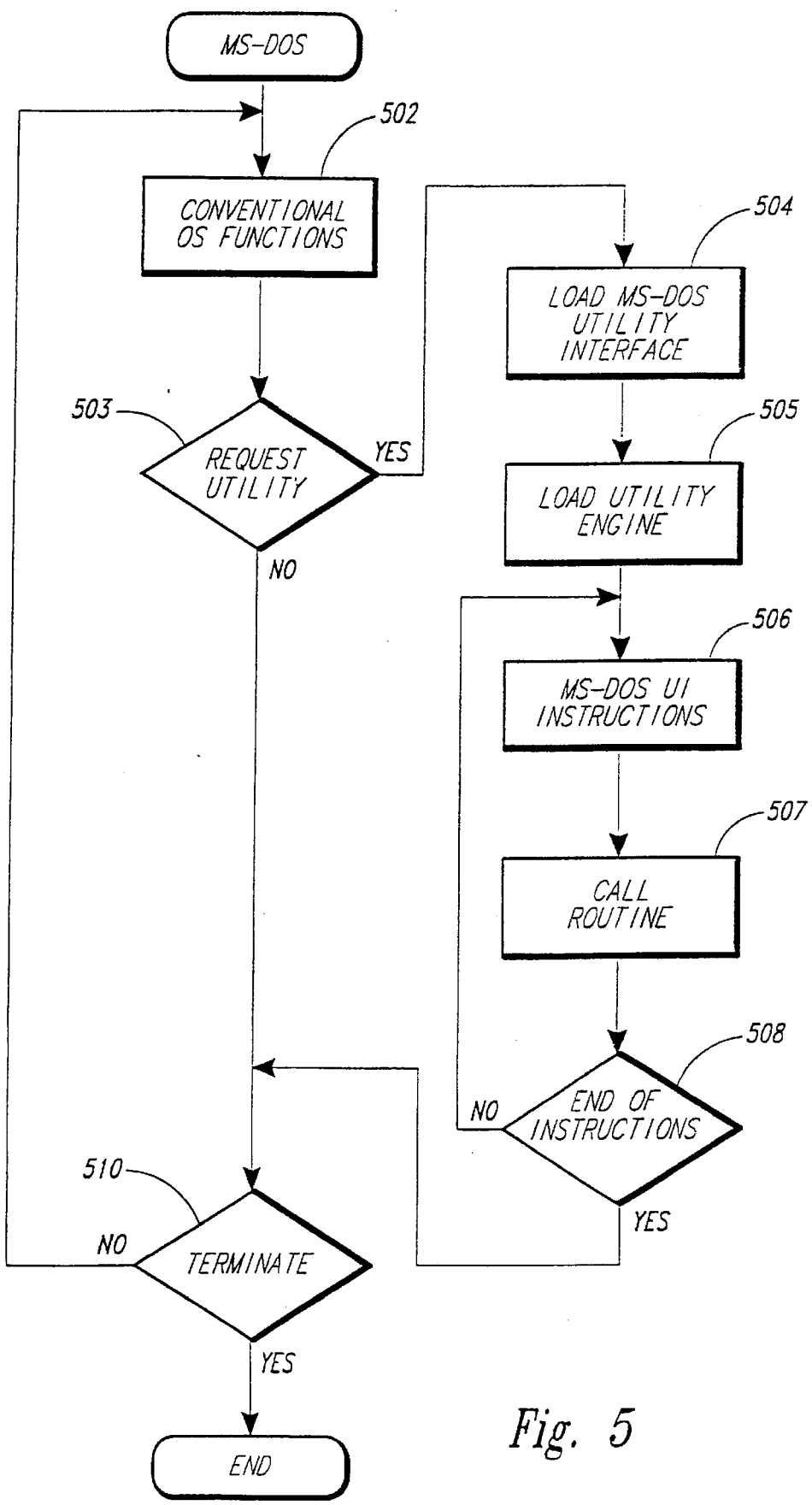
FIG. 5 is a flow diagram of the relevant portion of the MS-DOS operating system.

As explained above, when a utility is executed by the MS-DOS operating system, the MS-DOS operating system performs its own utility interface instructions and executes the routines in the appropriate utility engine 325 to perform the same utility function that the Windows operating system performs. FIG. 5 shows a flow diagram of the program portion of the MS-DOS operating system 220 relevant to performing a requested MS-DOS utility. The flow diagram shown in FIG. 5 is, for example, a relevant portion of the MS-DOS command processor, or "shell" implemented by executing the well-known executable file "COMMAND.COM." It will be remembered that the MS-DOS operating system 220 has been originally described as an example of the external operating system with reference to the situation when the Windows operating system 210 is running as the active operating system. FIG. 5, however, illustrates the performance of a utility when the MS-DOS operating system is instead "active," to show that the same utility engine 325 that would be executed by the Windows operating system 210 is executed by the MS-DOS operating system 220 to perform the same utility function.

In step 502 of FIG. 5, the MS-DOS operating system program performs appropriate conventional operating system functions until, in step 503, the program determines that a request to perform a utility has been obtained. If so, control branches to step 504 wherein the program loads the MS-DOS Utility Interface 310 from the appropriate utility file 300, as shown in FIG. 3. For example, if the requested utility is "DIR" via the MS-DOS command processor, then the MS-DOS Utility Interface 310 from the file "DIR.EXE" is loaded. In step 505, the program loads the utility engine 325 by executing the load instructions 311 shown in FIG. 3. In step 506, the load instructions 311 are executed to load the utility engine 325. In step 506, the appropriate MS-DOS user interface instructions 312 are executed to perform appropriate MS-DOS user interface functions. In step 507, an appropriate functional routine within the utility engine 325 is called (e.g. A() shown in FIG. 3), and the functional instructions therein are executed to perform all or a portion of the corresponding utility function. Using the example used above with reference to FIG. 4, the functional instructions within the routine "DirEngine" are executed to provide the utility function performed by the "DIR" utility, which is the same utility function performed by the Windows operating system 210 when a corresponding utility is executed thereby, as explained above. In step 508, the program determines whether additional instructions exist within the MS-DOS utility interface 310 and, if so, repeats steps 505 through 508. Otherwise, control proceeds to repeat steps 502 through 510 until step 510 determines that execution of the MS-DOS operating system is terminated. The program then ends.

Figure 6:
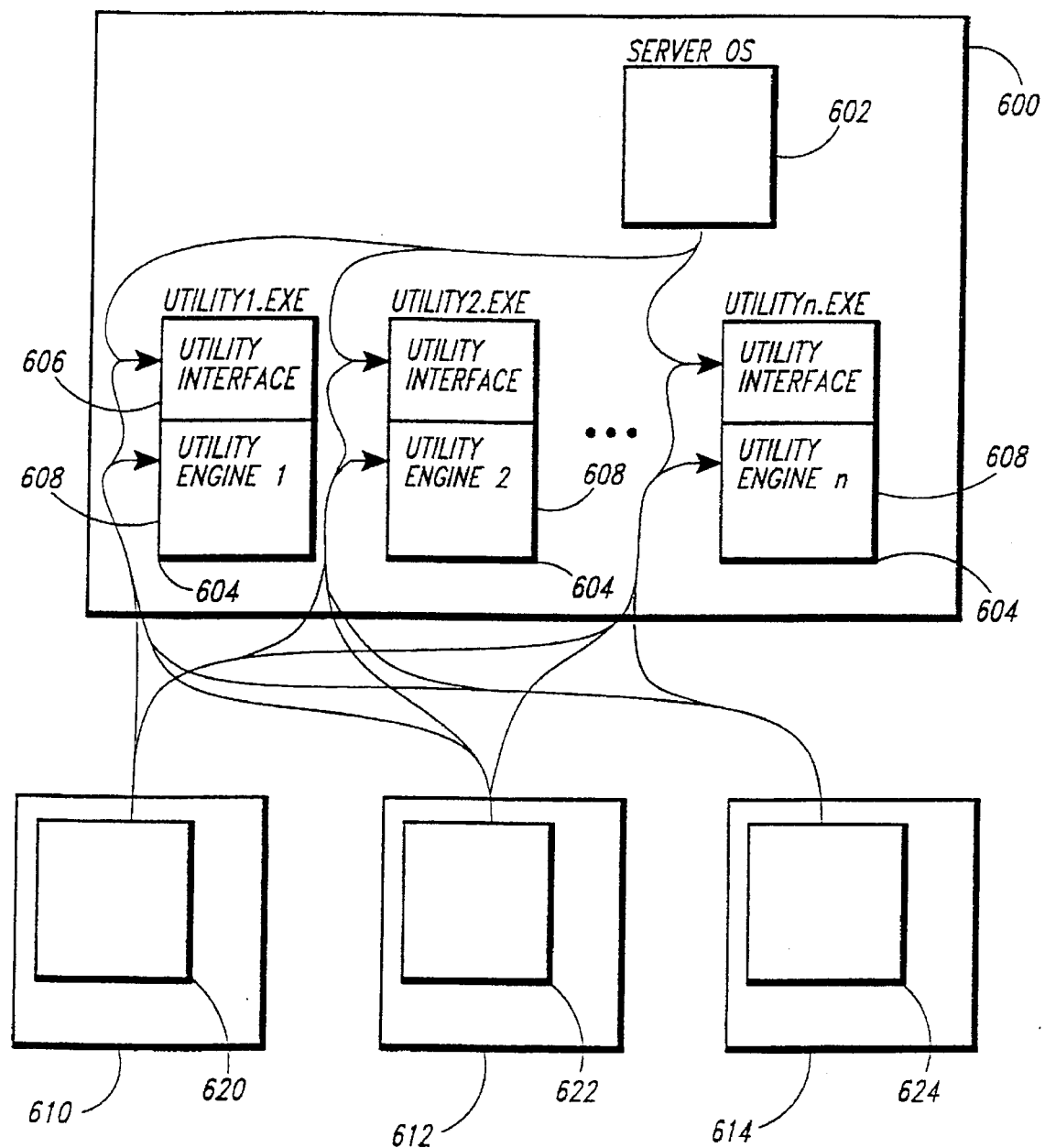
FIG. 6 is a block diagram of a remote system implementing the present invention.

FIG. 6 is a block diagram of a remote system which implements the present invention. A server system 600 contains a server operating system 602 which provides a number of server utility files 604. The server operating system 602 is, for example, the MS-DOS operating system 220, which provides a number of valuable disk/file management utilities, such as BACKUP, CHKDSK, DISKCOPY, DISKCOMP, FORMAT, LABEL, and RESTORE. Each server utility file is an executable file which includes a utility interface portion 606 having a load program as described above, and a utility engine 608 stored within a dynamic link library, also as described above. The server system 600 is connected to a number of workstations such as the illustrated three workstations 610, 612, and 614. Each workstation has an operating system 620, 622, and 624, respectively. The operating systems 620, 622 and 624 share the utility engines 608. The operating systems 620, 622 and 624 can be different operating systems such as, for example, either the MS-DOS operating system 220 or the Windows operating system 210. Because they execute the same routines from the same functions utility engines 608, however, the operating systems perform the same utility functions.

In accordance with the present invention, an active operating system can take advantage of the utility function of a utility provided by an external operating system. For example, as has been described with reference to a preferred embodiment, the Windows operating system can take advantage of a utility function performed by a utility provided by the MS-DOS operating system 220. As such, the utility functions performed by the following MS-DOS utilities can also be performed by the Windows operating system 210 or an application running thereon:

FILE/DIRECTORY MANIPULATION UTILITIES

ATTRIB {Displays or changes the attributes of selected files in a directory}
COMP {Compares the contents to two sets of files}
CHDIR {Changes a directory to a different path; displays the working directory}
COPY {Copies one or more files to another location.}
DIR {Lists the files in a directory}
DEL {Deletes all files specified by the drive and pathname}
FC {Compares two files or two sets of files and displays the differences between them}
FIND {Searches for a specific string of text in a file or files}
MKDIR {Makes a new directory}
PRINT {Prints a text file on a lineprinter while processing other MS-DOS commands}
RMDIR {Removes a directory from a multiple level directory structure}
RENAME {Changes the name of a file}
TYPE {Displays the contents of a text file on the screen}
UNDELETE {Recovers files which have been deleted}

DISK/FILE UTILITIES

BACKUP {Backs up one or more files from one disk to another}
CHKDSK {Scans the disk in the specified drive and checks it for errors}
DISKCOMP {Compares the contents of the disk in the source drive to the disk in the target drive}
DISKCOPY {Copies the contents of the floppy disk in the source drive to a floppy disk in the target drive}
FORMAT {Formats the disk in the specified drive to accept MS-DOS files}
LABEL {Creates, changes, or deletes the volume label on a disk}
RESTORE {Restores files that were backed up using the backup program}

MISCELLANEOUS UTILITIES

DATE {Enters or changes the date known to the system}
HELP {Displays explanations of MS-DOS commands}
MEM {Displays amount of available memory}
PATH {Sets a command search path}
TIME {Allows user to enter or change the time known to the system}

Although the present invention has been described with reference to specific embodiments, it should be appreciated that one of ordinary skill in the art may make various changes in the form and scope of the invention without departing from the spirit of the invention. For the sake of efficiency, for example, the functional instructions for numerous utilities may be provided within a single dynamic link library stored in a single file or other data structure having instructions executable by different systems or programs. The scope of the invention is defined by the claims.

We claim:

1. In a computer system, said computer system having a utility for perforating a utility function, a first operating system, a second operating system and a memory, said utility function for managing and controlling said computer system, said utility comprising a utility engine containing functional instructions for performing said utility function and external user interface instructions for interfacing with a user executable by said second operating system, a method for performing said utility function by said first operating system comprising the computer-implemented steps of:

providing said utility engine containing functional instructions for performing said utility function, wherein said same functional instructions are executable by a path of execution from said first operating system and said second operating system;

loading said first operating system and said second operating system into said memory;

storing in said memory said utility engine by said first operating system; and executing said functional instructions contained within said stored utility engine by a path of execution from said first operating system.

2. The method of claim 1 wherein the step of storing in said memory said utility engine includes the step of loading a dynamic link library containing said utility engine into said memory by said first operating system.

3. The method of claim 1 wherein the step of storing in said memory said utility engine includes the step of retrieving said utility engine from an executable file.

4. In a computer system, said computer system having a utility for performing a utility function, a first operating system, a second operating system and a memory containing an application program, said utility function for managing and controlling said computer system, said utility comprising a utility engine containing functional instructions for performing said utility function and external user interface instructions for interfacing with a user executable by said second operating system, a method for performing said utility function by said application program comprising the computer-implemented steps of:

providing said utility engine containing functional instructions for performing said utility function, wherein said same functional instructions are executable by a path of execution from said first operating system and said second operating system;

loading said first operating system and said second operating system into said memory;

storing in said memory said utility engine by said application program; and executing said functional instructions contained within said stored utility engine by a path of execution from said application program.

5. The method of claim 4 wherein the step of storing in said memory said utility engine includes the step of loading a dynamic link library containing said utility engine into said memory by said application program.

6. The method of claim 4 wherein the step of storing in said memory said utility engine includes the step of retrieving said utility engine from an executable file.

7. A distributed system comprising:

a utility comprising functional instructions executable by a first operating system and a second operating system when performing a utility functions and user interface instructions executable by said first operating system when interfacing with a user, said utility function for managing and controlling said distributed system;

said first operating system for invoking said functional instructions and said user interface instructions;

said second operating system for invoking said same functional instructions;

means for requesting invocation of said utility by said first operating system and said second operating system;

means, responsive to the requested invocation of said utility by said second operating system, for invoking said functional instructions to perform said utility function; and means, responsive to the requested execution of said utility by said first operating system, for executing said user interface instructions and said functional instructions to perform said utility function.

8. The distributed system of claim 7 wherein said first operating system is stored in memory of a first computer and said second operating system is stored in memory of a second computer.

9. In a computer system, said computer system having a utility, a plurality of operating systems and a memory, said utility for performing utility a function and comprising functional instructions, said utility function for managing and controlling said computer system, a method in said computer system for sharing a utility between operating systems, the computer-implemented method comprising the steps of:

providing said utility function having functional instructions, wherein said same functional instructions are executable on a path of execution from all of the operating systems;

loading said operating systems into said memory;

receiving a request to an operating system for said operating system to perform said utility;

loading said functional instructions of said requested utility into said memory by said operating system; and executing said loaded functional instructions of said requested utility by a path of execution from the operating system to per form said utility function.

10. In a computer system, said computer system having a plurality of operating systems, a storage device containing a utility and a memory, said utility for performing a utility function and comprising user interface instructions executable by a first of said operating systems and functional instructions executable by a path of execution from all of said operating systems, said utility function for managing and controlling said computer system, a method in said computer system for sharing a utility between operating systems comprising the computer-implemented steps of:

loading said operating systems into said memory;

when a request is made to execute sad utility by said first operating system,
loading said utility into said memory by said first operating system;
invoking said user interface instructions of said loaded utility by said first operating system; and
executing said functional instructions of said loaded utility by a path of execution from said first operating system to perform said utility function; and when a request is made to execute said same utility by a second of the operating systems,
loading said same functional instructions into said memory by said second operating system; and
executing said loaded functional instructions by a path of execution from said second operating system to perform said same utility function.

11. The method of claim 10 wherein the step of loading said utility into said memory includes the step of retrieving said utility from an executable file by said first operating system.

12. The method of claim 10 wherein the step of loading said functional instructions into said memory includes the step of retrieving said functional instructions from an executable file by said second operating system.

13. The method of claim 10 wherein the step of loading said functional instructions into said memory includes the step of storing said functional instructions into a data structure in said memory.

14. The method of claim 10 wherein said functional instructions are contained within a dynamically linked library, wherein the step of loading said functional instructions into said memory includes the step of loading said dynamically linked library into said memory.

15. The method of claim 14 wherein said dynamically linked library has an entry point, wherein the step of loading said dynamically linked library includes the step of retrieving said entry point of said dynamically linked library to provide access to said functional instructions.

16. A distributed system comprising:
a utility component comprising functional instructions for performing a utility function, said utility function for managing and controlling the distributed system; and
a memory containing:
  a first operating system for receiving requests from a user and for executing said functional instructions of said utility component on a path of execution from said first operating system in response to receiving a request from said user for said first operating system to perform said utility function; and
  a second operating system for receiving requests from said user and for executing said same functional instructions of said same utility component on a path of execution from said second operating system in response to receiving a request from said user for said second operating system to perform said utility function.

17. The distributed system of claim 16 wherein said first operating system is stored in memory of a first computer system and said second operating system is stored in memory of a second computer system.

18. A computer-readable medium whose contents cause a computer system to perform processing, said computer system having a utility for performing a utility function, a first operating system, a second operating system and a memory, said utility function for managing and controlling said computer system said utility comprising a utility engine containing functional instructions for performing said utility function and external user interface instructions for interfacing with a user executable by said second operating system by performing the steps of:
providing said utility engine containing functional instructions for performing said utility function, wherein said same functional instructions are executable by a path of execution from said first operating system and said second operating system;
loading said first operating system and said second operating system into said memory;
storing in said memory said utility engine by said first operating system; and
executing said functional instructions contained within said stored utility engine by a path of execution from said first operating system.

19. A computer-readable medium whose contents cause a computer system to perform processing, said computer system having a utility for performing a utility function, a first operating system, a second operating system and a memory containing an application program, said utility function for managing and controlling said computer system, said utility comprising a utility engine containing functional instructions for performing said utility function and external user interface instructions for interfacing with a user executable by said second operating system, by performing the steps of:
providing said utility engine containing functional instructions for performing said utility function, wherein said same functional instructions are executable by a path of execution from said first operating system and said second operating system;
loading said first operating system and said second operating system into said memory;
storing in said memory said utility engine by said application program; and
executing said functional instructions contained within said stored utility engine by a path of execution from said application program.

20. A computer-readable medium whose contents cause a computer system to perform processing, said computer system having a utility, a plurality of operating systems and a memory, said utility for performing a utility function and comprising functional instructions, said utility function for managing and controlling said computer system, by performing the steps of:
providing said utility function having functional instructions, wherein said same functional instructions are executable on a path of execution from all of the operating systems;
loading said operating systems into said memory;
receiving a request to an operating system for said operating system to perform said utility;
loading said functional instructions of said requested utility into said memory by said operating system; and
executing said loaded functional instructions of said requested utility by a path of execution from the operating system to perform said utility function.

21. A computer-readable medium whose contents cause a computer system to perform processing, said computer system having a plurality of operating systems, a storage device containing a utility and a memory, said utility for performing a utility function and comprising user interface instructions executable by a first of said operating systems and functional instructions executable by a path of execution from all of said operating systems, said utility function for managing and controlling said computer system, by performing the steps of:
loading said operating systems into said memory;
when a request is made to execute said utility by said first operating system,
  loading said utility into said memory by said first operating system;
  invoking said user interface instructions of said loaded utility by said first operating system; and
  executing said functional instructions of said loaded utility by a path of execution from said first operating system to perform said utility function; and
when a request is made to execute said same utility by a second of the operating systems,
  loading said same functional instructions into said memory by said second operating system; and
  executing said loaded functional instructions by a path of execution from said second operating system to perform said same utility function.

* * * * *